(12) United States Patent
Chiu

(10) Patent No.: US 8,872,977 B2
(45) Date of Patent: *Oct. 28, 2014

(54) METHOD AND APPARATUS FOR CONTENT ADAPTIVE SPATIAL-TEMPORAL MOTION ADAPTIVE NOISE REDUCTION

(75) Inventor: Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 863 days.

This patent is subject to a terminal disclaimer.

(21) Appl. No.: 13/074,800

(22) Filed: Mar. 29, 2011

(65) Prior Publication Data

US 2011/0176059 A1 Jul. 21, 2011

Related U.S. Application Data

(63) Continuation of application No. 11/647,019, filed on Dec. 27, 2006, now Pat. No. 7,952,646.

(51) Int. Cl.
| | |
|---|---|
| *H04N 5/00* | (2011.01) |
| *H04N 5/14* | (2006.01) |
| *H04N 9/64* | (2006.01) |
| *G06K 9/40* | (2006.01) |
| *G06T 5/00* | (2006.01) |
| *G06T 5/20* | (2006.01) |
| *H04N 5/213* | (2006.01) |
| *G06T 7/20* | (2006.01) |

(52) U.S. Cl.
CPC ...... *H04N 5/213* (2013.01); *G06T 2207/20021* (2013.01); *G06T 2207/20032* (2013.01); *G06T 5/002* (2013.01); *G06T 5/20* (2013.01); *H04N 5/144* (2013.01); *G06T 2207/20012* (2013.01); *G06T 2207/10016* (2013.01); *G06T 2207/20192* (2013.01); *G06T 7/2033* (2013.01)

USPC .......... 348/607; 348/606; 348/620; 348/701; 382/260

(58) Field of Classification Search
CPC ............. G06T 5/50; G06T 5/003; G06T 5/20; G06T 5/002; G06T 7/20; G06T 7/2006; G06T 7/0085; G06T 2207/1006; G06T 2207/20182; G06T 2207/20012; G06T 2207/20192; G06K 9/40; H04N 19/00066; H04N 19/00266; H04N 5/21; H04N 5/144; H04N 5/123; H04N 7/0137; H04N 7/0145; H04N 7/26771; H04N 19/00587; H04N 19/0003; H04N 9/646
USPC .......... 348/606, 607, 620, 622, 701; 382/260
See application file for complete search history.

(56) References Cited

U.S. PATENT DOCUMENTS

| | | |
|---|---|---|
| 4,242,705 A | 12/1980 | Ebihara |
| 5,491,519 A | 2/1996 | Kim |

(Continued)

FOREIGN PATENT DOCUMENTS

| | | |
|---|---|---|
| EP | 721286 | 7/1996 |
| JP | 06-260889 | 9/1994 |

(Continued)

OTHER PUBLICATIONS

"EP Search Report", EP 07 87 0007, (Aug. 4, 2011), 4 pages.

(Continued)

*Primary Examiner* — Brian Yenke
(74) *Attorney, Agent, or Firm* — Blakely, Sokoloff, Taylor & Zafman LLP

(57) ABSTRACT

According to one embodiment, a method is disclosed. The method includes performing a local content analysis on video data to classify pixels into singular pixels, motion pixels and static pixels.

13 Claims, 3 Drawing Sheets

(56) References Cited

U.S. PATENT DOCUMENTS

| | | | |
|---|---|---|---|
| 5,500,685 A | 3/1996 | Kokaram | |
| 5,936,676 A * | 8/1999 | Ledinh et al. | 348/452 |
| 6,061,000 A * | 5/2000 | Edwards | 340/854.6 |
| 6,061,100 A | 5/2000 | Ward et al. | |
| 6,067,125 A * | 5/2000 | May | 348/607 |
| 6,181,382 B1 * | 1/2001 | Kieu et al. | 348/459 |
| 6,281,942 B1 * | 8/2001 | Wang | 348/607 |
| 6,754,371 B1 * | 6/2004 | Kondo et al. | 382/107 |
| 7,003,173 B2 * | 2/2006 | Deshpande | 382/261 |
| 7,145,607 B1 * | 12/2006 | Hui | 348/607 |
| 7,199,838 B2 * | 4/2007 | Lin et al. | 348/607 |
| 7,346,224 B2 * | 3/2008 | Kong et al. | 382/261 |
| 7,667,773 B2 * | 2/2010 | Han | 348/452 |
| 7,697,612 B2 * | 4/2010 | Koshiba et al. | 375/240.16 |
| 7,724,307 B2 * | 5/2010 | Wan et al. | 348/620 |
| 7,729,555 B2 * | 6/2010 | Chen et al. | 382/261 |
| 7,769,089 B1 * | 8/2010 | Chou | 375/240.29 |
| 7,944,503 B1 * | 5/2011 | Zhai et al. | 348/452 |
| 8,135,234 B2 * | 3/2012 | Tourapis et al. | 382/275 |
| 8,212,920 B2 | 7/2012 | Burns et al. | |
| 8,218,655 B2 * | 7/2012 | Tourapis et al. | 375/240.29 |
| 8,279,345 B2 * | 10/2012 | Rossignol et al. | 348/620 |
| 8,306,355 B2 * | 11/2012 | Su et al. | 382/274 |
| 8,447,130 B2 * | 5/2013 | Chiu | 382/261 |
| 8,553,783 B2 * | 10/2013 | Deng et al. | 375/240.27 |
| 8,581,293 B2 * | 11/2013 | Ryu et al. | 257/99 |
| 2001/0019633 A1 | 9/2001 | Tenze | |
| 2002/0101543 A1 * | 8/2002 | Ojo et al. | 348/607 |
| 2003/0202682 A1 * | 10/2003 | Yanagisawa et al. | 382/103 |
| 2004/0120601 A1 * | 6/2004 | Ruol et al. | 382/275 |
| 2005/0030395 A1 * | 2/2005 | Hattori | 348/246 |
| 2005/0094889 A1 * | 5/2005 | Lin et al. | 382/261 |
| 2005/0135698 A1 * | 6/2005 | Yatsenko et al. | 382/260 |
| 2005/0280739 A1 * | 12/2005 | Lin et al. | 348/607 |
| 2005/0280869 A1 * | 12/2005 | Kameyama | 358/3.01 |
| 2006/0023794 A1 * | 2/2006 | Wan et al. | 375/240.29 |
| 2006/0050783 A1 * | 3/2006 | Le Dinh et al. | 375/240.2 |
| 2006/0056724 A1 * | 3/2006 | Le Dinh et al. | 382/274 |
| 2006/0093236 A1 * | 5/2006 | Drezner et al. | 382/272 |
| 2006/0114351 A1 * | 6/2006 | Tanigawa | 348/441 |
| 2006/0158550 A1 * | 7/2006 | Zhou et al. | 348/452 |
| 2006/0158562 A1 * | 7/2006 | Rhee | 348/607 |
| 2006/0285020 A1 * | 12/2006 | Shin et al. | 348/701 |
| 2007/0070250 A1 * | 3/2007 | Zhou et al. | 348/607 |
| 2007/0076962 A1 * | 4/2007 | Kodama | 382/232 |
| 2007/0091188 A1 * | 4/2007 | Chen et al. | 348/273 |
| 2007/0195199 A1 * | 8/2007 | Chen et al. | 348/607 |
| 2007/0206117 A1 * | 9/2007 | Tian et al. | 348/452 |
| 2007/0236609 A1 * | 10/2007 | Pathak et al. | 348/620 |
| 2008/0062309 A1 * | 3/2008 | Zhai et al. | 348/452 |
| 2009/0136152 A1 * | 5/2009 | Kameyama | 382/275 |
| 2010/0165207 A1 * | 7/2010 | Deng et al. | 348/620 |
| 2010/0245670 A1 * | 9/2010 | Takeda et al. | 348/607 |
| 2011/0096231 A1 * | 4/2011 | Winger et al. | 348/448 |

FOREIGN PATENT DOCUMENTS

| | | |
|---|---|---|
| JP | 10-013718 | 1/1998 |
| WO | WO 03/017676 | 2/2003 |
| WO | WO03/017676 | 2/2003 |

OTHER PUBLICATIONS

Tsuban, Chen , "The past, present, and future of image and multidimensional signal processing", *IEEE Signal Processing Magazine*, vol. 15, No. 2, (Mar. 1, 1998), 21-58.

Zlokolica, et al., "Video Denoising Using Multiple Class Averaging with Multiresolution", XP002332716, (Sep. 18, 2003), 172-179.

"PCT Search Report", PCT/US2007/088996, (Apr. 28, 2008).

"Perception Adaptive Temporal TV-Noise Reduction Using Contour Preserving Pre-filter Techniques", *IEEE 1998*.

\* cited by examiner

Edge detection measure

METHOD AND APPARATUS FOR CONTENT ADAPTIVE SPATIAL-TEMPORAL MOTION ADAPTIVE NOISE REDUCTION

The present patent application is a Continuation application claiming priority to application Ser. No. 11/647,019, filed Dec. 27, 2006 now U.S. Pat. No. 7,952,646.

FIELD OF THE INVENTION

The present invention relates to computer systems; more particularly, the present invention relates to video processing.

BACKGROUND

Reducing noise artifact is a very important factor in the field of video processing. Picture noise is an undesirable visual phenomenon that is caused by the imperfect processes of video capturing, transmission, coding and storage. For instance, on the receiving end of a video application, a noise reduction technique is typically applied as part of post-processing filtering to improve picture quality.

The current generation of media processors reduce noise artifact by using techniques such as motion compensation, motion adaptive, temporal or spatial filters. The motion compensation approach generally achieves the best filtering effect due to the extensive amount of computation and memory spending in the motion search to figure out the best temporal correlation to reduce the noise artifact.

Motion adaptive and temporal approaches do not require the extensive motion search as motion compensation. However, the amount of the computation/memory involved in the temporal processing is not insignificant. The spatial domain approach is the most computationally economical at the cost of picture quality.

BRIEF DESCRIPTION OF THE DRAWINGS

The invention is illustrated by way of example and not limitation in the figures of the accompanying drawings, in which like references indicate similar elements, and in which.

DETAILED DESCRIPTION

Figure 1:
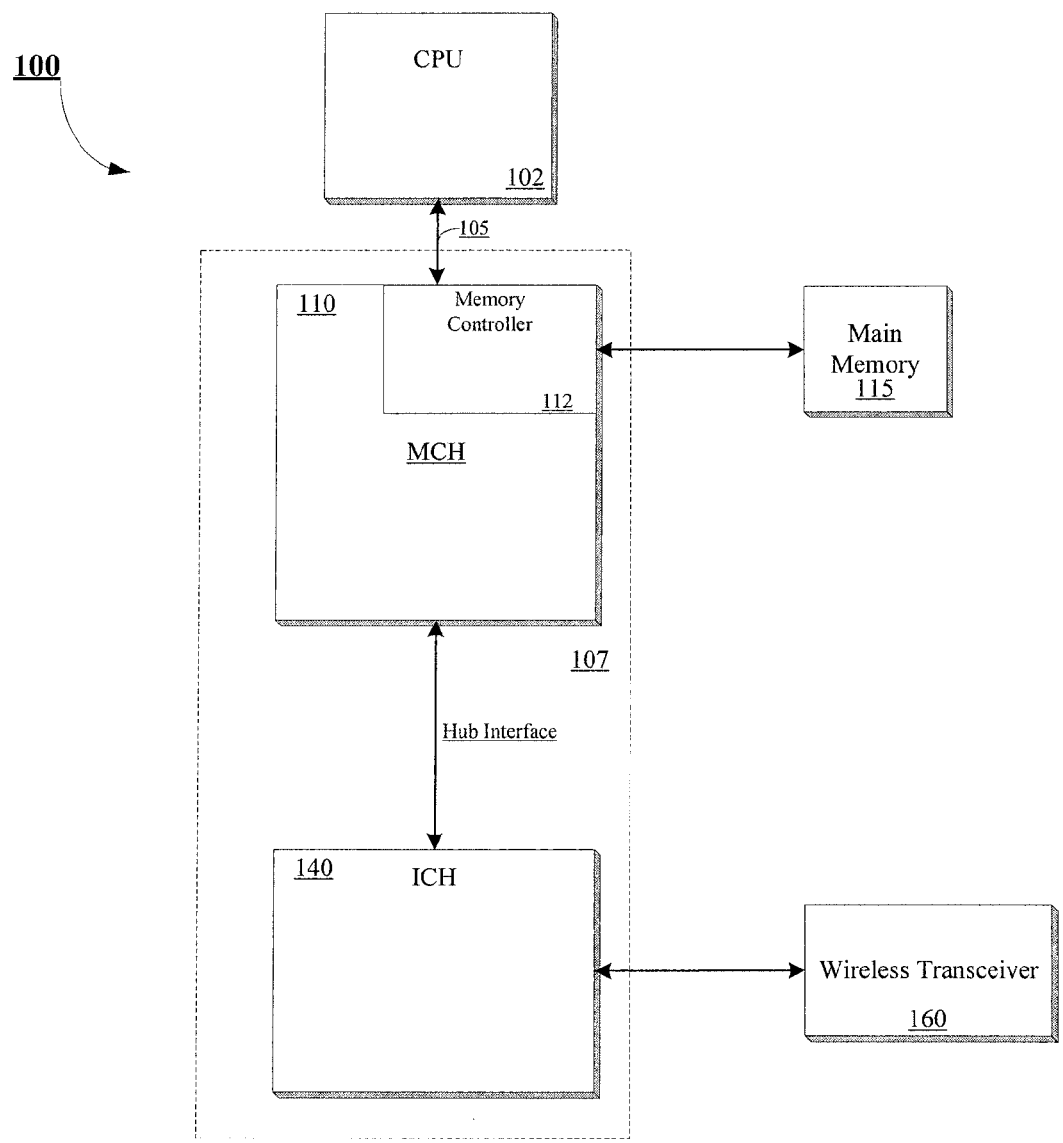
FIG. 1 is a block diagram of one embodiment of a computer system.

A content adaptive spatial-temporal motion adaptive mechanism for reducing the noise residing in pictures is disclosed. In one embodiment, the mechanism includes components to enhance image/video visual quality by reducing the noise artifact caused by the process of video capturing, transmission, coding and storage; to provide the content analysis by utilizing motion detection, edge detection and singularity detection to select a noise reduction filter; to provide noise reduction filtering to reduce the visual degradation caused from singular noise pixels; to reduce the noise by a spatial-temporal filter with the reference pixels including the selected set of the pixel from the spatial-temporal neighborhood; to reduce the noise by a spatial filter with the reference pixels including the selected set of the pixel from the spatial neighborhood; and to utilize the information of edge detection to adapt the filtering for the spatio-temporal/spatial filter for the noisy pictures.

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), FIG. 1 is a block diagram of one embodiment of a computer system 100. Computer system 100 includes a central processing unit (CPU) 102 coupled to interconnect 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented multiple processors, or multiple processor cores.

In a further embodiment, a chipset 107 is also coupled to interconnect 105. Chipset 107 may include a memory control component (MC) 110. MC 110 may include a memory controller 112 that is coupled to a main system memory 115. Main system memory 115 stores data and sequences of instructions that are executed by CPU 102 or any other device included in system 100.

MC 110 may be coupled to an input/output control component (IC) 140 via a hub interface. IC 140 provides an interface to input/output (I/O) devices within computer system 100. IC 140 may support standard I/O operations on I/O interconnects such as peripheral component interconnect (PCI), accelerated graphics port (AGP), universal serial interconnect (USB), low pin count (LPC) interconnect, or any other kind of I/O interconnect (not shown). In one embodiment, IC 140 is coupled to a wireless transceiver 160.

According to one embodiment, IC 140 includes an instruction set to perform a content adaptive spatial-temporal motion adaptive process on received video data. However in other embodiments, IC 140 may include hardware modules to perform the process. In further embodiments, CPU 102 may be implemented to perform the process.

Figure 2:
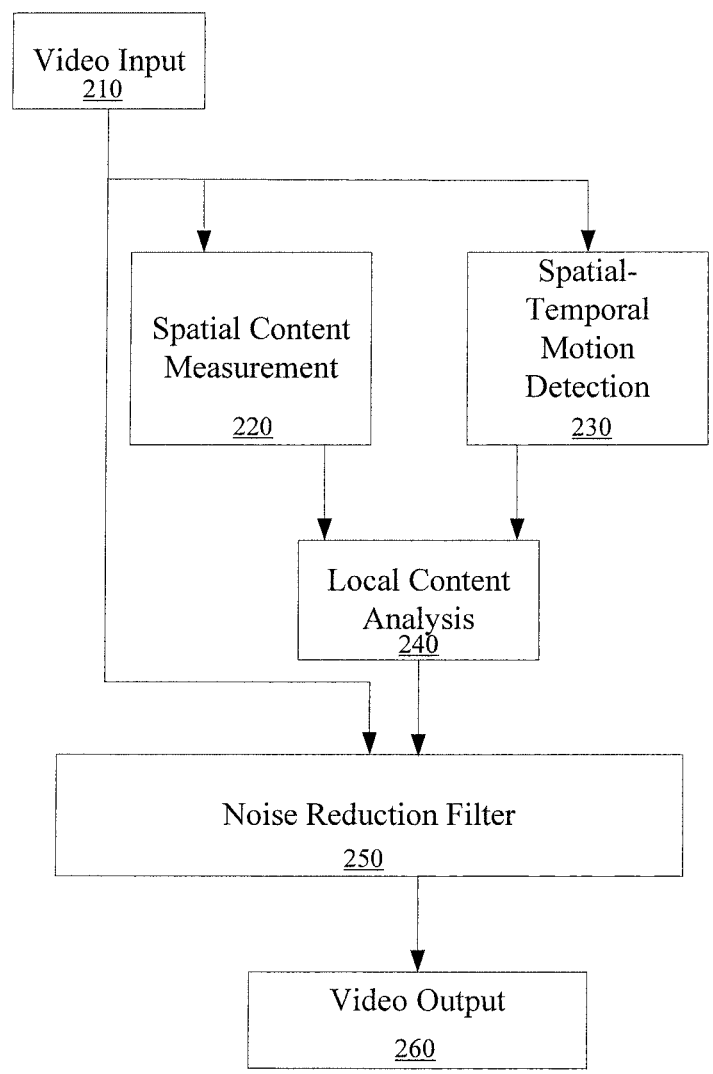
FIG. 2 is a flow diagram illustrating one embodiment of content adaptive spatial-temporal motion adaptive noise filtering.

FIG. 2 is a flow diagram illustrating one embodiment for performing content adaptive spatial-temporal motion adaptive noise filtering. At processing block 210, a video input is received. At processing block 220, per-pixel spatial content features, such as edge and singularity, are measured. At processing block 230, a per-block temporal feature of motion movement is measured.

At processing block 240, local content analysis is performed to classify pixels into singular pixels, motion pixels and static pixels. At processing block 250, various filtering techniques are applied to each different category of pixel according to the classification information and the content measurement information in order to reduce the noise artifact. At processing block 260, the processed video data is transmitted from IC 140. The individual processes 220-250 are described below in greater detail.

Spatial-Temporal Motion Detection

Spatial Temporal Motion Detection considers both temporal and spatial information to better detect motion of picture content. In one embodiment, a process is implemented to combine temporal difference and local spatial complexity. Given the set of a current target pixel $\{c(x,y)\}$, the set of neighboring pixels surrounding $\{c(x,y)\}$ is denote as $\{n(x,y)\}$, while the set of corresponding pixels in previous picture is $\{(p(x,y)\}$ According to one embodiment, a Spatial vertical complexity measure (SVCM) is defined as SVCM=Norm{(n(x,y)−n(x,y+2))}, and a Spatial horizontal complexity measure (SHCM) is defined as SHCM=Norm{(n(x,y)−n(x+1,y))}. Further, a Temporal difference measure (TDM) is defined as TDM=Norm{(n(x,y)−p(x,y)). In one embodiment, the Norm measure is the sum of an absolute difference (SAD), and a maximum absolute difference (MAD).

Thus, Spatial-temporal motion measure (STMM) is defined as STMM=C1*TDM/{(C2*SVCM+C3*SHCM)+C4, where C1, C2, C3, C4 are pre-defined weighting factors according to application requirements. In one embodiment, the simplified version of STMM with the STMM equal to TDM is the generic case of motion detection in the field of video processing. The STMM is based on the set of $\{c(x,y)\}$ and is common for every pixel in $\{c(x,y)\}$.

Spatial Content Measurement

To perform Spatial Content Measurement, two spatial features are measured for each pixel: edge and singularity. For singularity detection, the current target pixel c(x,y) and the set of immediate neighboring pixel $\{n(x,y)\}$ are considered. The c(x,y) is defined to be singular pixel if, for every pixel n(x,y) in $\{n(x,y)\}$, c(x,y) is always larger than n(x,y) by a pre-defined threshold number, or if c(x,y) is always less than n(x,y) by a pre-defined threshold number. According to one embodiment, the immediate eight neighboring pixels are used as the default size of $\{n(x,y)\}$.

For edge detection, a formula, such as the Sobel formula, is applied to estimate edge information. The Sobel formula is represented as $$E\_h = \begin{bmatrix} -1 & -2 & -1 \\ 0 & 0 & 0 \\ 1 & 2 & 1 \end{bmatrix} \quad E\_v = \begin{bmatrix} -1 & 0 & 1 \\ -2 & 0 & 2 \\ -1 & 0 & 1 \end{bmatrix}$$

The first-order Sobel edge measure (EM) is defined as:

$$EM(c(x,y)) = |\underline{n9}(x,y)*E\_h| + |\underline{n9}(x,y)*E\_v|$$

where $\underline{n9}(x,y)$ is the 3×3 spatial neighborhood pixels of the current target pixel c(x,y)

Local Content Analysis

To perform Local Content Analysis, the information from the singularity detection is collected. If the target pixel is identified as a singular pixel, the target pixel is forwarded to a singularity filter component of the noise reduction filter, described in greater detail below. In one embodiment, non-singular pixels are forwarded for a motion test for classification into a category of motion pixel or static pixel.

In the example of a non-singular target pixel c(x,y) and the associated neighboring pixels $\{n(x,y)\}$, c(x,y) is classified as a motion pixel if the number of the surrounding pixels whose STMM value is larger than a pre-defined threshold value, STMM_th, is larger than a pre-defined value, number_big_STMM_pixel_th. Otherwise, the non_singular c(x,y) is rendered as a static pixel. The process for implementing the motion test is as follows:

```
Number_big_STMM_pixel(c(x,y))=0
Loop every pixel n(x,y) in {n(x,y)} {
If (STMM(n(x,y)) > STMM_th) number_big_STMM_pixel(c(x,y))++;
}
If (number_big_STMM_pixel(c(x,y)) >
number_big_STMM_pixel_th) pixel c(x,y) is a motion pixel
Else pixel c(x,y) is a static pixel
```

In another embodiment, the sum of STMM is used for the set of {n(x,y)} as the measurement. This process for implementing the motion test is as follows:

```
sum_STMM(c(x,y))=0
Loop every pixel n(x,y) in {n(x,y)} {
sum_STMM(c(x,y)) += STMM(n(x,y))
}
If(sum_STMM(c(x,y)) > sum_STMM_th) pixel c(x,y) is a motion pixel
Else pixel c(x,y) is a static pixel (sum_STMM_th is a pre-defined threshold value)
```

The motion test technique described in this embodiment is the measurement taken on the neighboring pixels centered on the target pixel. In other embodiments, a simplified and efficient version is applicable on pre-defined block based pixels, and thus the pixels inside the block share the common motion measure. The motion pixel and the static pixel are sent to spatial filter and spatial-temporal filter components, respectively, of the noise reduction filter.

Noise Reduction Filter

Figure 3:
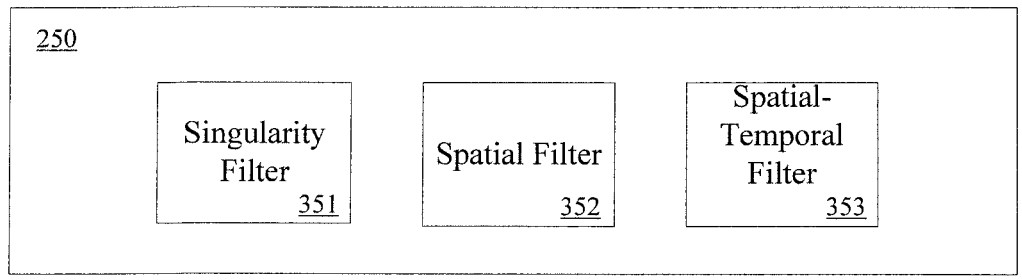
FIG. 3 illustrates one embodiment of a noise reduction filter.

As discussed above, the noise reduction filter 250 process includes sub-processes. As shown in FIG. 3, these sub-processes include a singularity filter process 351, a spatial filter process 352 and a spatial-temporal filter process 353.

The singularity filter 351 includes a median filter to handle detected singular pixels. In one embodiment, the size of the filter support is five and the set of reference pixels is the immediate neighboring pixels to the left, right, top, and bottom of the target pixel. In another embodiment, the filter support is extended to nine by adding the immediate top-right, top-left, bottom-right and bottom-left.

The content adaptive filter 352 includes a content adaptive, edge preserved spatial filter applied on identified motion pixels. Before taking the filtering, the outer reference pixels are removed based on the pixel difference measurement. Considering the target pixel c(x,y) and the associated set of spatial neighboring pixels {nS(x,y)}, the process is implemented as below:

$$\begin{cases} \text{If } (ABS(c(x,y) - n(x,y)) > & n(x,y) \text{ is a good reference pixel} \\ \quad \text{edge\_th}(c(x,y))), & \\ \quad \text{Otherwise,} & \text{remove } n(x,y) \text{ from } \{nS(x,y)\} \end{cases}$$

Figure 4:
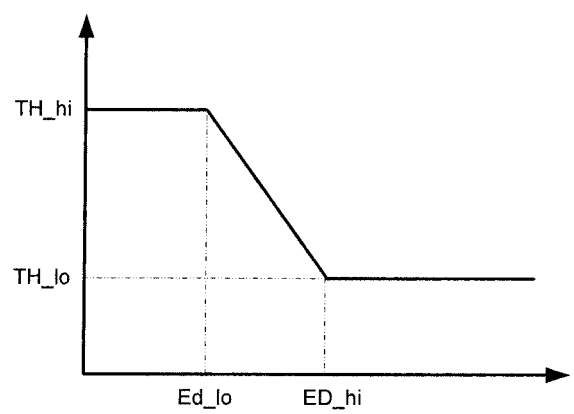
FIG. 4 illustrates one embodiment of a graph mapping an edge detection measure versus a threshold value for a reference pixel removal process.

In one embodiment, the newly formed {nS(x,y)} is denoted as {nS'(x,y)}. The edge_th is the threshold value based on the edge detection measure of the target pixel and the mapping is described in FIG. 4. Thus, the spatial filter (spatial_filter) is defined as:

$$\left( \frac{1}{\sum_{n(x,y)\in\{nS'(x,y)\}} w(n(x,y))} \right) \cdot \left( \sum_{n(x,y)\in\{nS'(x,y)\}} w(n(x,y)) \cdot n(x,y) \right)$$

where w(n(x,y)) is the weighting factor.

The content adaptive spatial-temporal filter 352 is an extension of the spatial filter implemented by including the set of the temporal pixels into the consideration of a reference pixel. In one embodiment, the set of pixel in the neighboring pixels of the previous/next pictures is denoted as {nT(c(x,y))}. In such an embodiment, the same selection process described above with reference to the target pixel c(x,y) is used to remove outer pixels and form a new set of reference pixel as {nT'(c(x,y))}. Thus, the spatial-temporal filter (spatial-temporal_filter) is defined below as:

$$\left( \frac{1}{\sum_{n(x,y)\in\{nS'(x,y)\}} wS(n(x,y)) + \sum_{n(x,y)\in\{nT'(x,y)\}} wT(n(x,y))} \right) \cdot$$

$$\left( \sum_{n(x,y)\in\{nS'(x,y)\}} wS(n(x,y)) \cdot n(x,y) + \sum_{n(x,y)\in\{nT'(x,y)\}} wT(n(x,y)) \cdot n(x,y) \right)$$

where w(nS(x,y)) is the weighting factor for spatial reference pixels and w(nT(x,y)) is the weighting factor for temporal reference pixels.

The above-described reduces noise artifact to achieve enhanced video quality by combining local spatial information with temporal change to estimate the effect of visual viewing. Further, spatial and spatial-temporal filter techniques are implemented to preserve sharpness in the phase of noise reduction by utilizing the spatial edge information to adaptively refine our spatial and spatial-temporal filter to achieve better edge-preserved noise reduction visual quality mechanism.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method comprising:
   measuring a temporal feature of motion movement of video data prior to performing the local content analysis;
   measuring per-pixel spatial content features of the video data;
   performing a local content analysis on the video data to classify each of a plurality of pixels in the video data as one of singular pixels, motion pixels and static pixels; and
   performing noise reduction filtering on the pixels, by:
     performing singularity filtering on the singular pixels;
     performing spatial filtering on the motion pixels; and
     performing spatial temporal filtering on the static pixels.

2. The method of claim 1 wherein measuring per-pixel spatial content features comprises measuring edge content features and singularity content features.

3. The method of claim 2 wherein measuring singularity content features comprises examining a current target pixel and immediate neighboring pixels.

4. The method of claim 1 wherein measuring motion movement comprises examining temporal and spatial information.

5. The method of claim 4 further comprising combining temporal difference information and local spatial complexity information.

6. The method of claim 4 wherein performing a local content analysis to comprises measuring a per-block temporal feature of the motion movement to classify the pixels.

7. A video processor comprising:
   a component to measure a temporal feature of motion movement of video data prior to performing the local content analysis;
   a component to measure per-pixel spatial content features of the video data;

a component to perform a local content analysis on video data to classify each of a plurality of pixels in the video data as one of singular pixels, motion pixels and static pixels; and a component to perform noise reduction filtering on the pixels by performing singularity filtering on the singular pixels, performing spatial filtering on the motion pixels and performing spatial temporal filtering on the static pixels.

8. The video processor of claim 7 wherein the component to measure per-pixel spatial content measures edge content features and singularity content features.

9. The video processor of claim 8 wherein the component to measure singularity content features examines a current target pixel and immediate neighboring pixels.

10. The video processor of claim 7 wherein the component to measure motion movement examines temporal and spatial information.

11. The method of claim 10 further comprising combining temporal difference information and local spatial complexity information.

12. An article of manufacture including one or more computer readable media that embody a program of instructions, wherein the program of instructions, when executed by a processing unit, causes the processing unit to perform the process of:

measuring a temporal feature of motion movement of video data prior to performing the local content analysis;

measuring per-pixel spatial content features of the video data;

performing a local content analysis on the video data to classify each of a plurality of pixels in the video data as one of singular pixels, motion pixels and static pixels; and performing noise reduction filtering on the pixels, by:
performing singularity filtering on the singular pixels;
performing spatial filtering on the motion pixels; and
performing spatial temporal filtering on the static pixels.

13. The article of manufacture of claim 12 wherein measuring motion movement comprises examining temporal and spatial information.

* * * * *